(12) United States Patent
Tseng

(10) Patent No.: US 8,708,595 B2
(45) Date of Patent: Apr. 29, 2014

(54) PANEL MEMBER LOCKING DEVICE

(75) Inventor: Ying-Chih Tseng, New Taipei (TW)

(73) Assignee: Hanwit Precision Industries Ltd., New Taipei (TW)

(*) Notice: Subject to any disclaimer, the term of this patent is extended or adjusted under 35 U.S.C. 154(b) by 62 days.

(21) Appl. No.: 13/604,463

(22) Filed: Sep. 5, 2012

(65) Prior Publication Data

US 2014/0064837 A1   Mar. 6, 2014

(51) Int. Cl.
*F16B 5/10* (2006.01)
*F16B 5/00* (2006.01)

(52) U.S. Cl.
CPC ..................... *F16B 5/0092* (2013.01)
USPC ............ 403/349; 403/254; 403/325; 403/343

(58) Field of Classification Search
CPC .......... F16B 5/10; F16B 5/0092; F16B 21/04; F16B 7/20; B25G 3/16
USPC ......... 403/348, 349, 353, 240, 252, 254, 231, 403/408.1, 343; 411/552; 24/453
See application file for complete search history.

(56) References Cited

U.S. PATENT DOCUMENTS

| | | | | |
|---|---|---|---|---|
| 2,816,471 | A * | 12/1957 | Bachman | 411/348 |
| 4,744,392 | A * | 5/1988 | Tade et al. | 138/89 |
| 6,126,359 | A * | 10/2000 | Dittrich et al. | 403/349 |
| 6,336,766 | B1 * | 1/2002 | De Villele | 403/348 |
| 6,874,828 | B2 * | 4/2005 | Roatis et al. | 292/199 |
| 8,007,196 | B2 * | 8/2011 | Whitling et al. | 403/109.1 |
| 8,567,733 | B2 * | 10/2013 | Wang et al. | 248/220.21 |
| 8,596,941 | B2 * | 12/2013 | Marlow et al. | 411/34 |
| 2011/0027038 | A1 * | 2/2011 | Hsu et al. | 411/105 |
| 2012/0227257 | A1 * | 9/2012 | Kalavitz | 29/825 |

* cited by examiner

*Primary Examiner* — Joshua Kennedy
(74) *Attorney, Agent, or Firm* — Muncy, Geissler, Olds & Lowe, P.C.

(57) ABSTRACT

A panel member locking device includes a bracket affixed to a frame shell, a driving rod vertically movably set in the bracket, a locking rod connected to the driving rod and vertically movable by the driving rod into a through hole at a first panel member and an oblong locating hole at a second panel member and rotatable by the driving rod between a locking position to lock the first and second panel members to the frame shell and an unlocking position to unlock the first and second panel members from the frame shell, a guide tube axially movably set in the bracket to guide the driving rod to move axially and rotate relative to the bracket, a spring member to impart an upward pressure to the guide tube, and a constraint member coupled between the driving rod and the bracket to limit the rotation angle of the driving rod.

7 Claims, 9 Drawing Sheets

PANEL MEMBER LOCKING DEVICE

BACKGROUND OF THE INVENTION

1. Field of the Invention

The present invention relates to fastener means for joining a frame shell and two panel members and more particularly, to a panel member locking device, which comprises a bracket affixed to a frame shell, a driving rod, a guide tube for guiding the driving rod to move axially up and down relative to the bracket, a constraint member coupled between the driving rod and the bracket for guiding the driving rod to rotate relative to the bracket, a spring member sleeved onto the guide tube and stopped between a head block of the guide tube and a shoulder inside the bracket, and a locking rod connected to the bottom end of the driving rod and movable and rotatable by the driving rod for detachably locking two stacked panel members at the frame shell.

2. Description of the Related Art

When joining panel members, fastening devices respectively formed of a screw nail, a rotary knob and a washer may be used. During application, the screw nail, rotary knob and washer of each fastening device are assembled and then mounted at a first panel member. When fastening the first panel member to a second panel member, rotate the rotary knob of each fastening device to drive the respective screw nail into a respective mounting screw hole at the second panel member. This multiple panel member fastening method can be used in a machine tool or other situations where multiple panel members are to be fastened in a stack. In a machine tool, the location where panel members are fastened together may be at the power drive or speed-adjustment unit inside the housing. The screw nails of the fastening devices may fall from the panel members and missed easily due to user's negligence during a panel member dismounting procedure, affecting further re-installation operation.

Further, with continuous innovation and progress of computer technology, the application of computers and many other electric and electronic products has been greatly enhanced and improved. Hard disk drive, CD-ROM, BD/DVD/DC duplicator, power adapter, and/or any of a variety of other peripheral devices may be installed in a computer or any of a variety of other electric and electronic products to expand the function. These attached devices may be fastened to the frame shell of the product with tie screws. However, mounting and dismounting the tie screws must use a screwdriver. Further, these tiny tie screws may be missed easily during the mounting or dismounting operation. To facilitate quick mounting and dismounting between the frame shell of a product and panel members of attached devices, a panel member locking device is created. As shown in FIGS. 8 and 9, this conventional panel member locking device A comprises a bracket A1 affixed to a frame shell B and providing a transverse sliding slot A23, a driving rod A2 axially movably and rotatably mounted in the bracket A1, a swivel handle A21 coupled to the headed top end of the driving rod A2 outside the bracket A1, a spring member A25 sleeved onto the driving rod A2 and supported between the headed top end of the driving rod A2 and an inside part of the bracket A1, a guide block A24 coupled between the transverse sliding slot A23 of the bracket A1 and the driving rod A2 to limit the rotation angle of the driving rod A2 relative to the bracket A1, and an externally threaded locking rod A22 connected to the bottom end of the driving rod A2. A user can operate the swivel handle A21 to lower the driving rod A2 and the externally threaded locking rod A22 and then to rotate the driving rod A2 and the externally threaded locking rod A22, inserting the externally threaded locking rod A22 through a through hole (not shown) at a first panel member C1 and driving the externally threaded locking rod A22 into a mounting screw hole C3 at a second panel member C2 to lock the first panel member C1 and the second panel member C2 at the frame shell B. In actual application, this design of panel member locking device A still has drawbacks as follows:

1. Subject to the constraint of the matching between the guide block A24 and the transverse sliding slot A23, the driving rod A2 can simply be rotated through a half round (180°), thus, the depth of engagement of the externally threaded locking rod A22 in the mounting screw hole C3 at the second panel member C2 is limited, and therefore the externally threaded locking rod A22 may be forced out of the mounting screw hole C3 at the second panel member C2 accidentally by an external force.
2. The driving rod A2 is rotatable relative to the bracket A1 through a half round (180°) subject to the constraint of the matching between the guide block A24 and the transverse sliding slot A23 without any positioning means, and the spring power of the spring member A25 may force the driving rod A2 to move the locking rod A22 away from the through hole of the first panel member C1 and the mounting screw hole C3 of the second panel member C2.
3. When the user operates the swivel handle A21 to rotate the driving rod A2 relative to the bracket A1, the user may rotate the locking rod A22 in the mounting screw hole C3 of the second panel member C2 in the wrong direction, resulting in locking instability.
4. The swivel handle A21 is formed of a metal wire rod not convenient to grasp, and therefore it is inconvenient to rotate the driving rod. A2.
5. Due to thin wall thickness of the mounting screw hole C3 of the second panel member C2, the contact area between the locking rod A22 and the second panel member C2 is limited, providing a low locking strength.

Therefore, it is desirable to provide a panel member locking device, which facilitates installation and locking operation and assures a high level of locking stability and tightness.

SUMMARY OF THE INVENTION

The present invention has been accomplished under the circumstances in view. It is therefore the main object of the present invention to provide a panel member locking device, which facilitates installation and locking and unlocking operations, assures a high level of locking stability and tightness, and avoids missing component parts during installation or locking/unlocking operation.

To achieve this and other objects of the present invention, a panel member locking device comprises a bracket affixed to a frame shell, a driving rod, a guide tube for guiding the driving rod to move axially up and down relative to the bracket, a constraint member coupled between the driving rod and the bracket for guiding the driving rod to rotate relative to the bracket, a spring member sleeved onto the guide tube and stopped between a head block of the guide tube and a shoulder inside the bracket, and a locking rod connected to the bottom end of the driving rod and movable and rotatable by the driving rod between a locking position and an unlocking position for detachably locking two stacked panel members at the frame shell.

Further, the bracket is shaped like a channel bar comprising a longitudinal sliding space, a mounting flange perpendicularly extended from one lateral side thereof, a plurality of mounting through holes located on the mounting flange at different elevations and affixed to respective mounting screw holes at the frame shell by respective screws, and an L-shaped limiter slot cut through the peripheral wall thereof in communication with the longitudinal sliding space. The L-shaped limiter slot defines a horizontal retaining slot portion, which extends perpendicular to the extending direction of the longitudinal sliding space, and a vertical release slot portion, which extends in parallel to the extending direction of the longitudinal sliding space. Further, the constraint member comprises an oblong coupling hole cut through opposing top and bottom sides thereof and coupled to the driving rod for synchronous rotation with the driving rod, and a horizontal stop block perpendicularly extended from the periphery thereof and coupled to the L-shaped limiter slot of the bracket.

Further, the driving rod comprises a top head, and a pinhole transversely cut through the top head. Further, a flat swivel grip is pivotally coupled to the top head of the driving rod by a pivot pin, which is fastened to the pinhole of the top head of the driving rod. The flat swivel grip comprises two bottom blocks respectively disposed at two opposite sides relative to the top head of the driving rod, a pivot hole respectively horizontally extended through each of the two bottom blocks and respectively pivotally coupled to the two distal ends of the pivot pin outside the top head of the driving rod, and two graspable finger recesses respectively located on two opposite sidewalls thereof.

Further, the guide tube comprises an axial hole extending through opposite top and bottom ends thereof for the passing of the driving rod, a head block located on the top end thereof around the axial hole, and a curved ramp located on the top side of the head block. The curved ramp of the head block of the guide tube defines two opposite retaining grooves and two opposite positioning grooves that are arranged at 90-degree intervals around the axial hole of the guide tube for supporting the constraint member between the locking position and the unlocking position. Further, the constraint member comprises two arched vertical bearing flanges downwardly protruded from the bottom edge thereof at two opposite sides and movable along the curved ramp between the retaining grooves and the positioning grooves.

DETAILED DESCRIPTION OF THE PREFERRED EMBODIMENT

Figure 1:
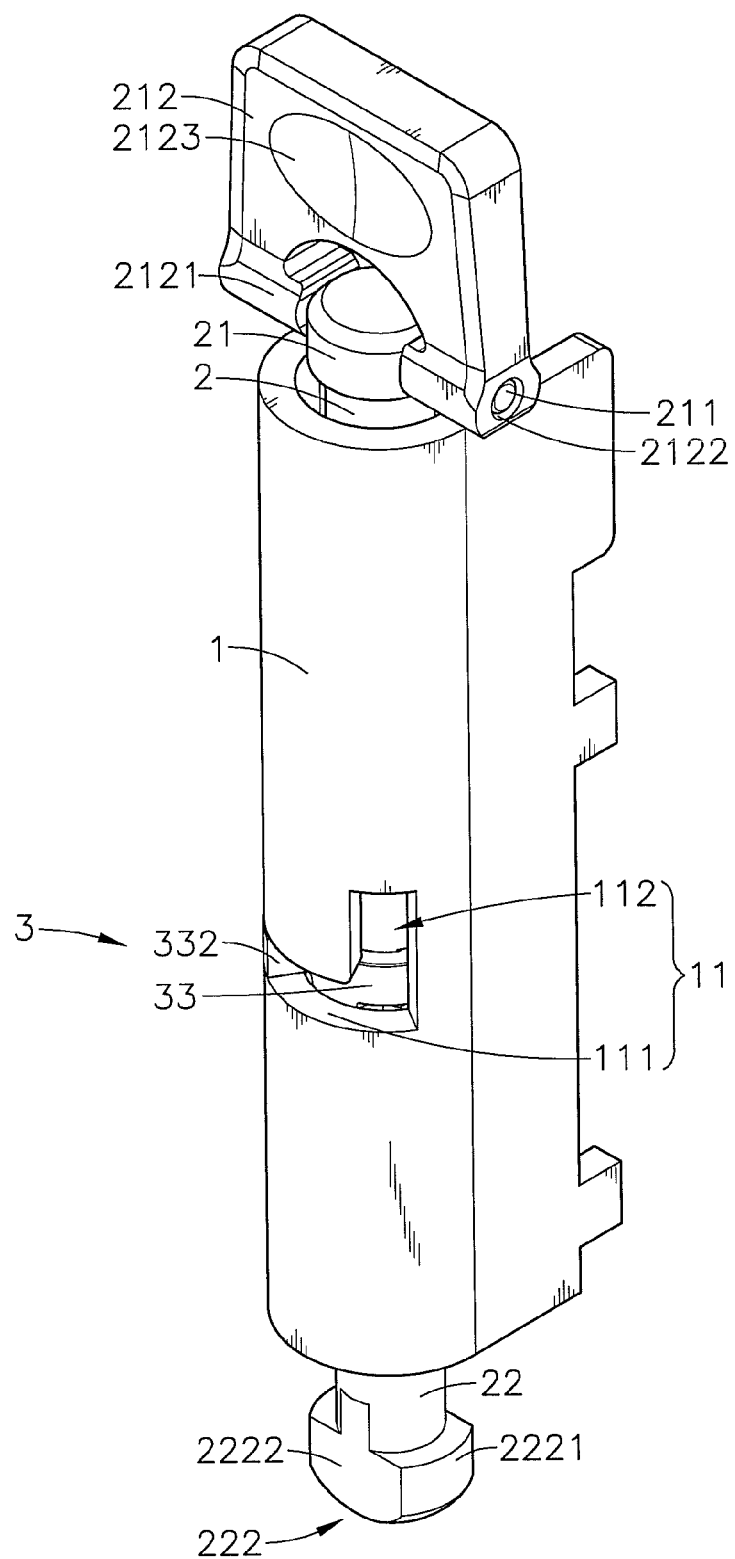
FIG. 1 is an oblique top elevational view of a panel member locking device in accordance with the present invention.
Figure 2:
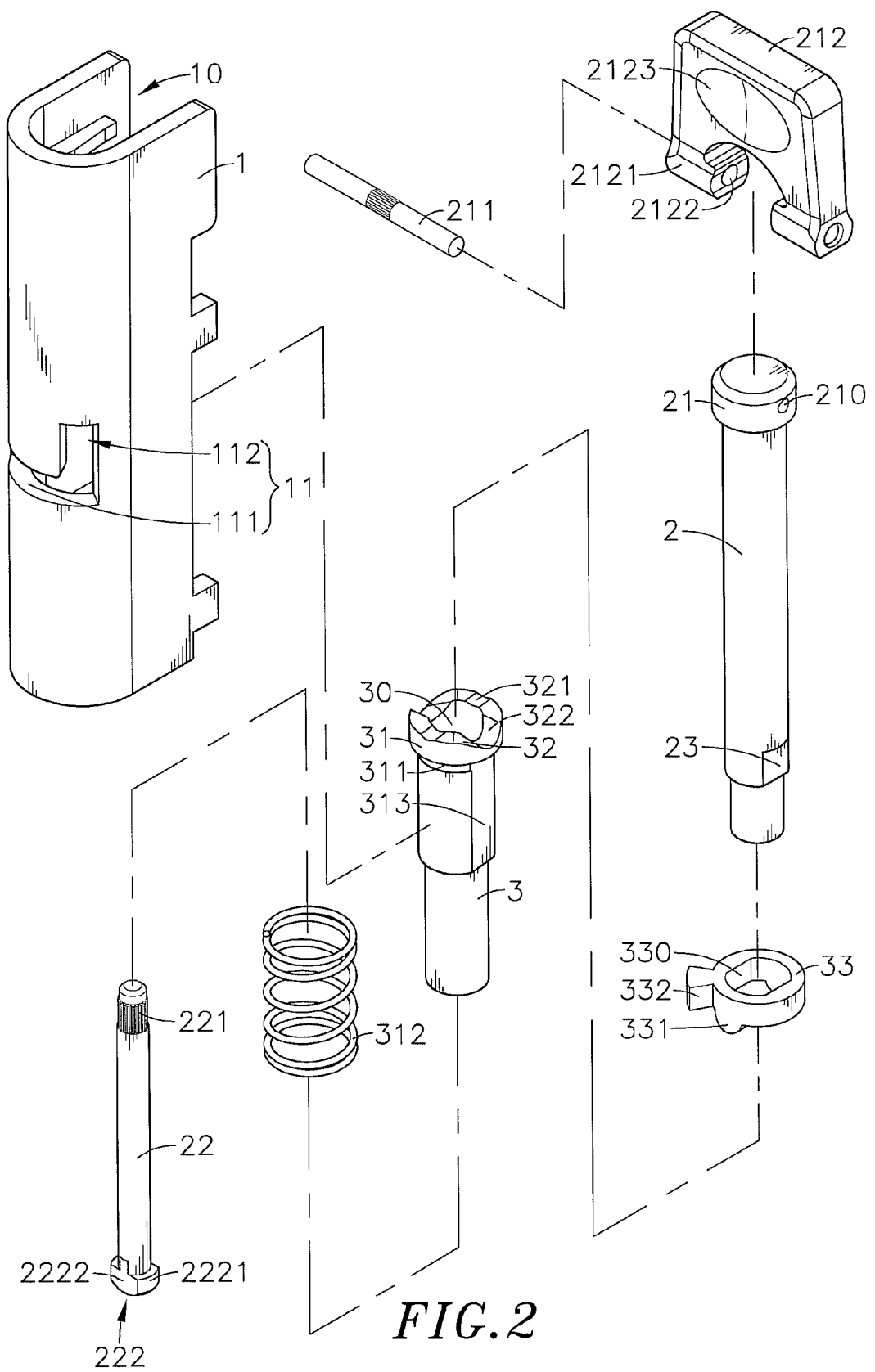
FIG. 2 is an exploded view of the panel member locking device in accordance with the present invention.
Figure 3:
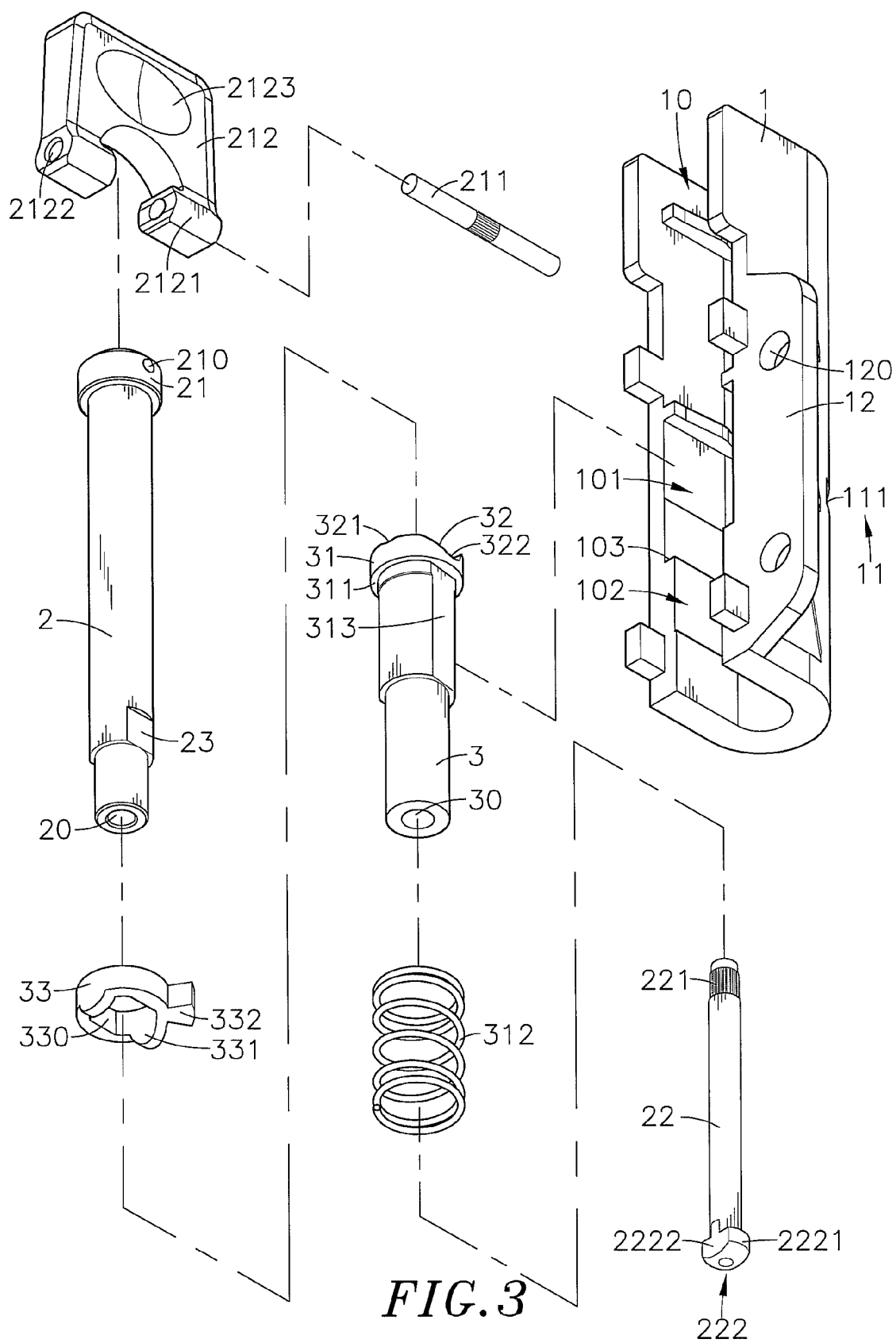
FIG. 3 corresponds to FIG. 2 when viewed from another angle.
Figure 4:
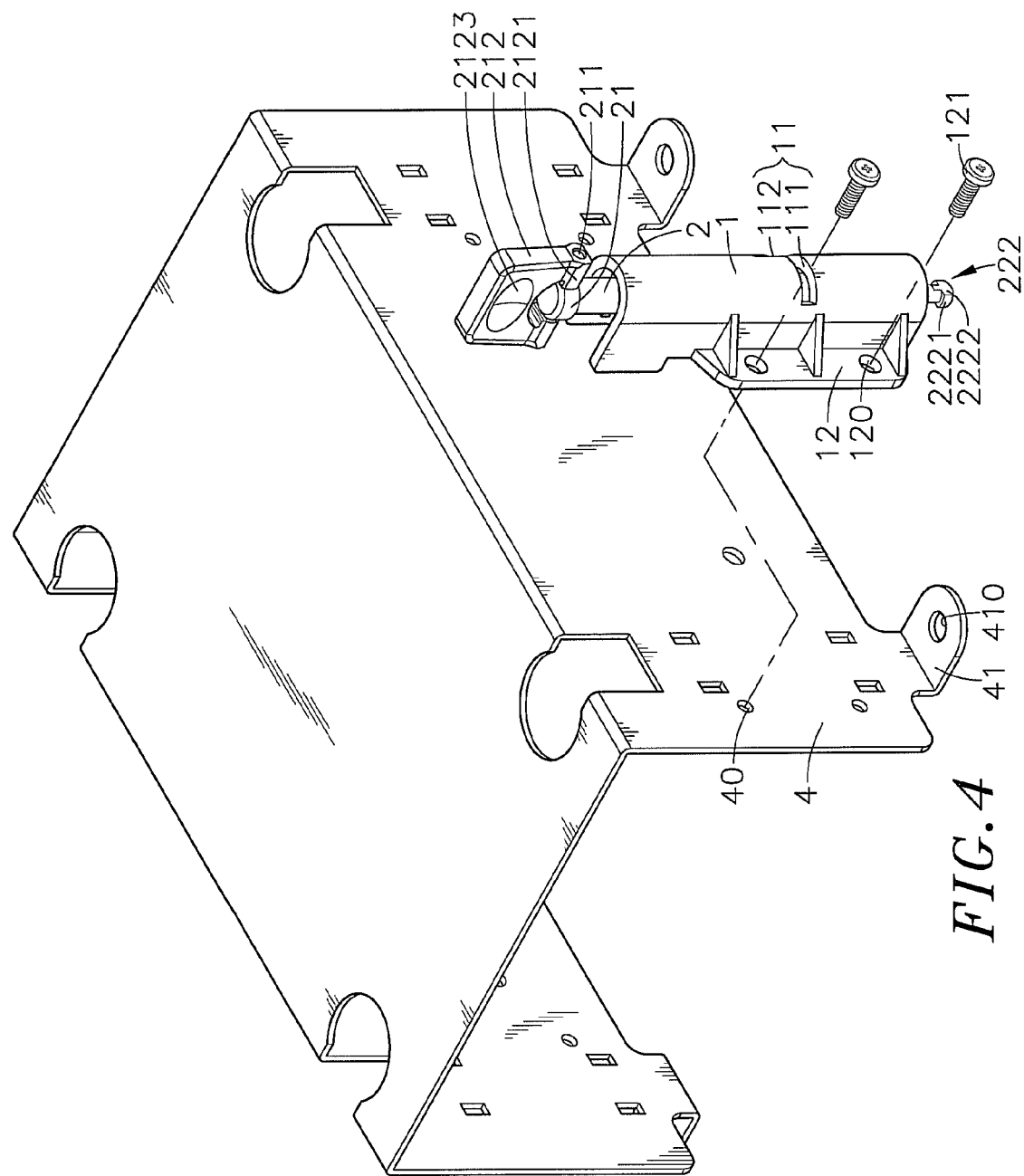
FIG. 4 is a schematic applied view of the present invention, illustrating the mounting arrangement between the bracket of the panel member locking device and the frame shell.
Figure 5:
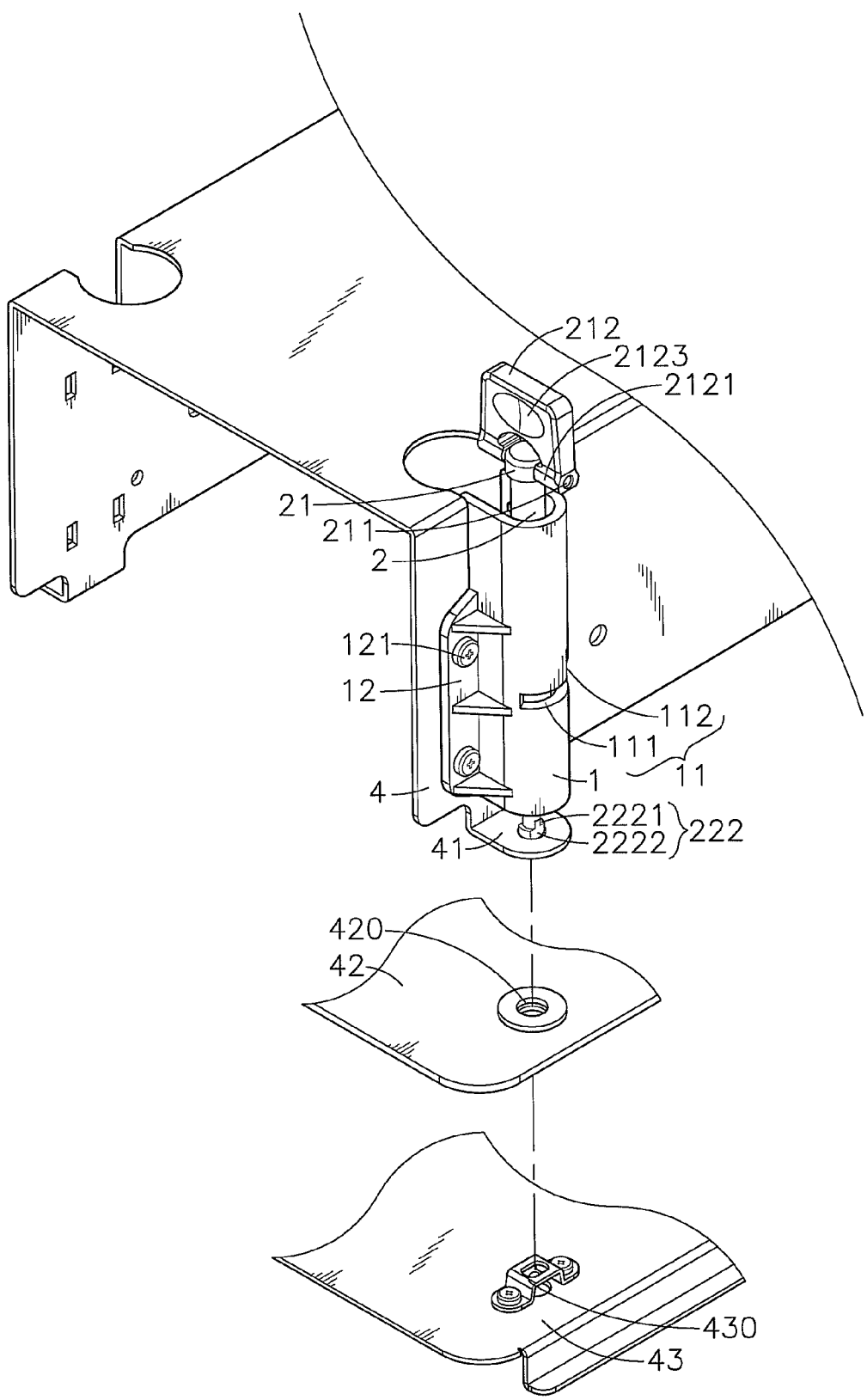
FIG. 5 corresponds to FIG. 4, illustrating the bracket affixed to the frame shell before connection between the frame shell and the first and second panel members.
Figure 6:
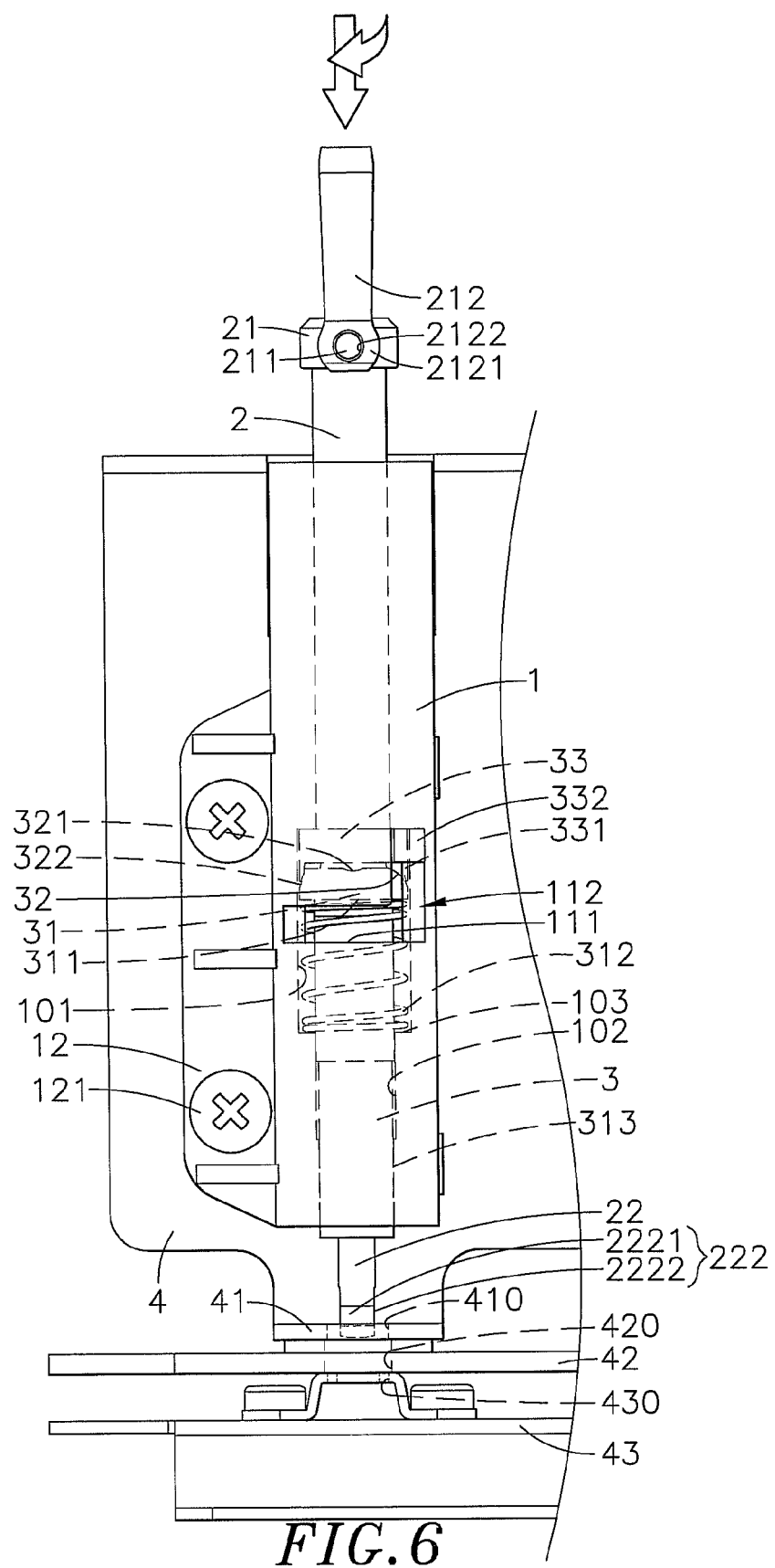
FIG. 6 corresponds to FIG. 5, illustrating the first and second panel members arranged in a stack and attached to the bottom side of the frame shell.
Figure 7:
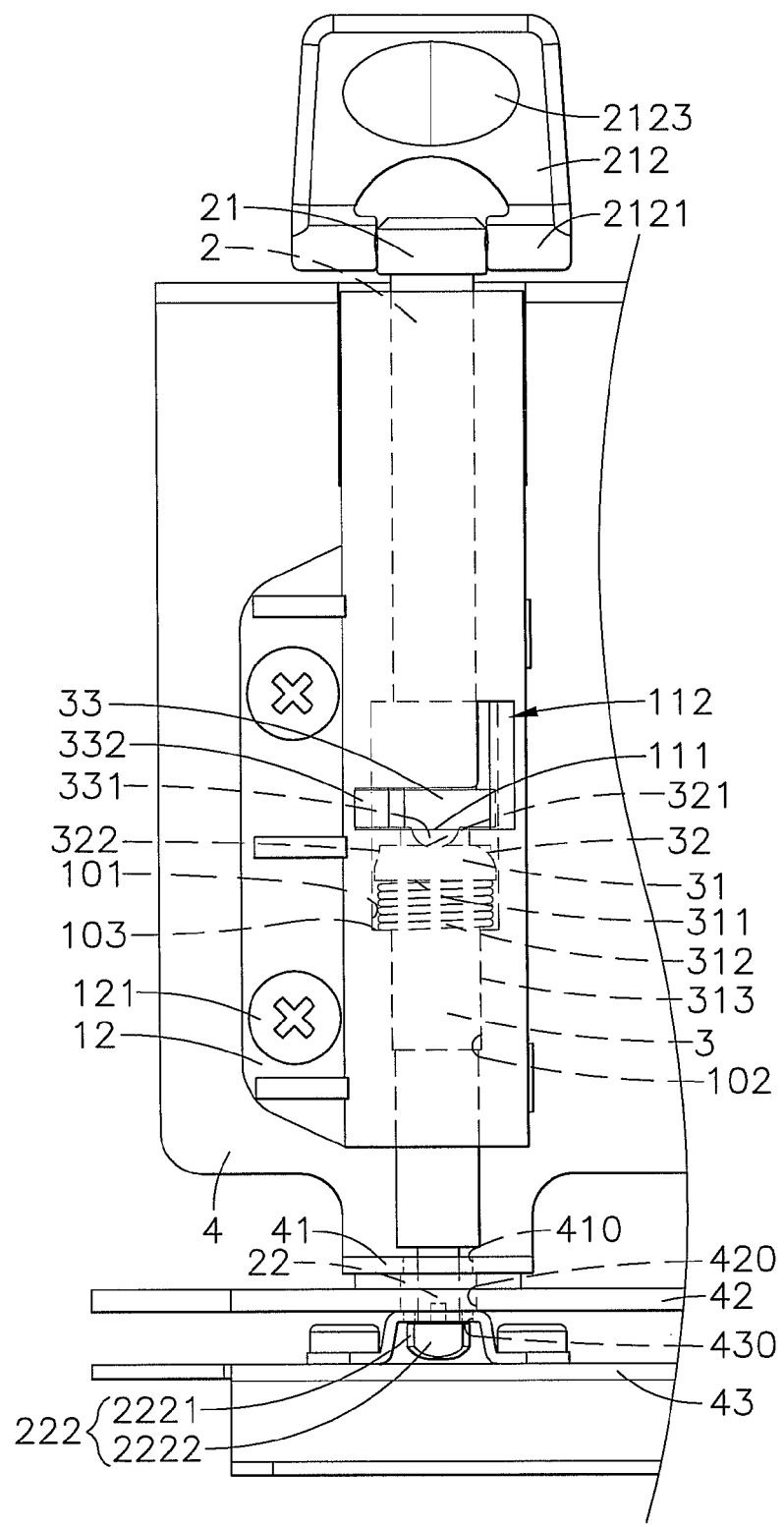
FIG. 7 corresponds to FIG. 6, illustrating the bottom locking end piece of the locking rod locked at the bottom side of the oblong locating hole of the second panel member.
Figure 8:
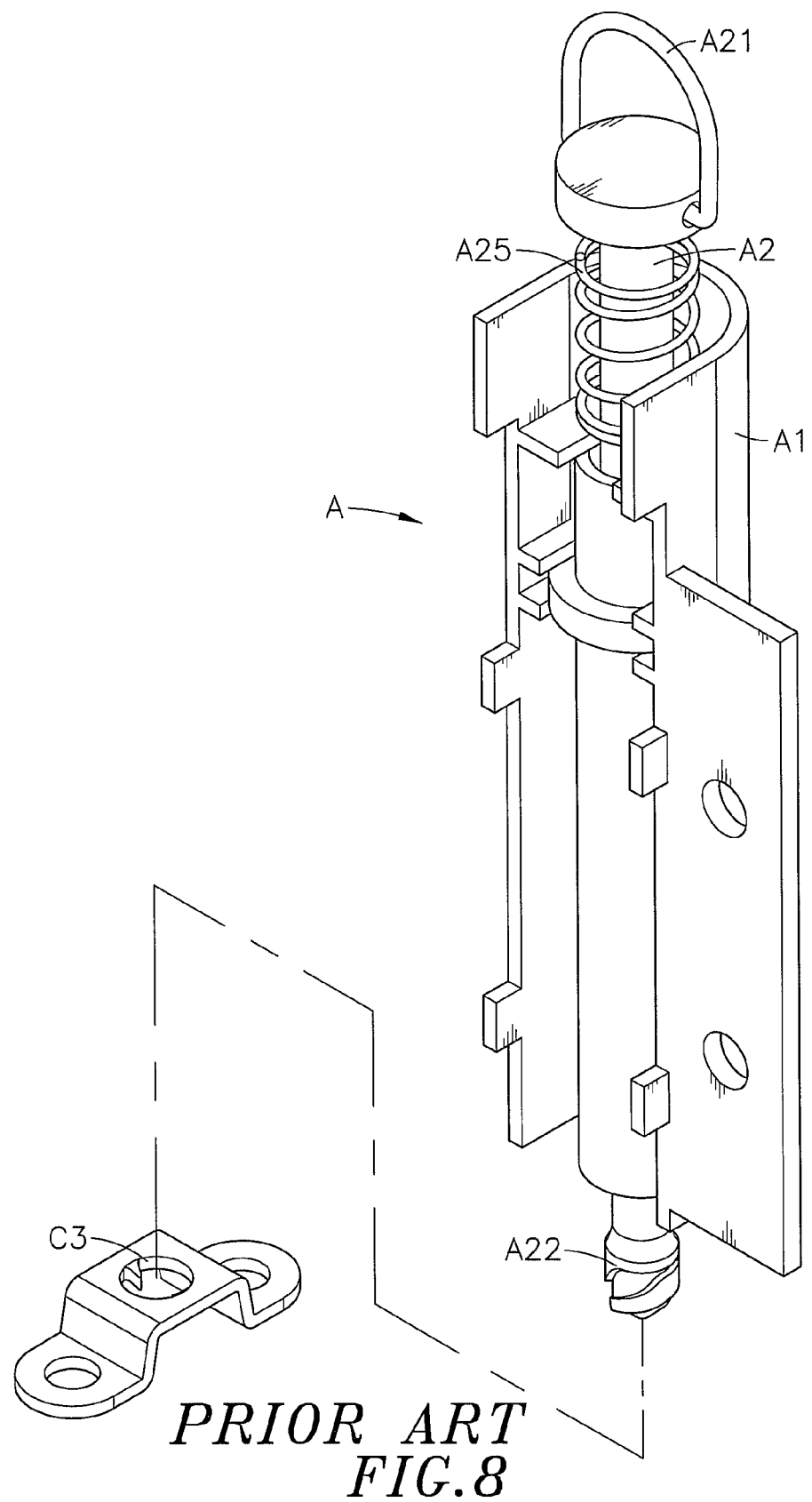
FIG. 8 is an oblique elevational view of a panel member locking device according to the prior art.
Figure 9:
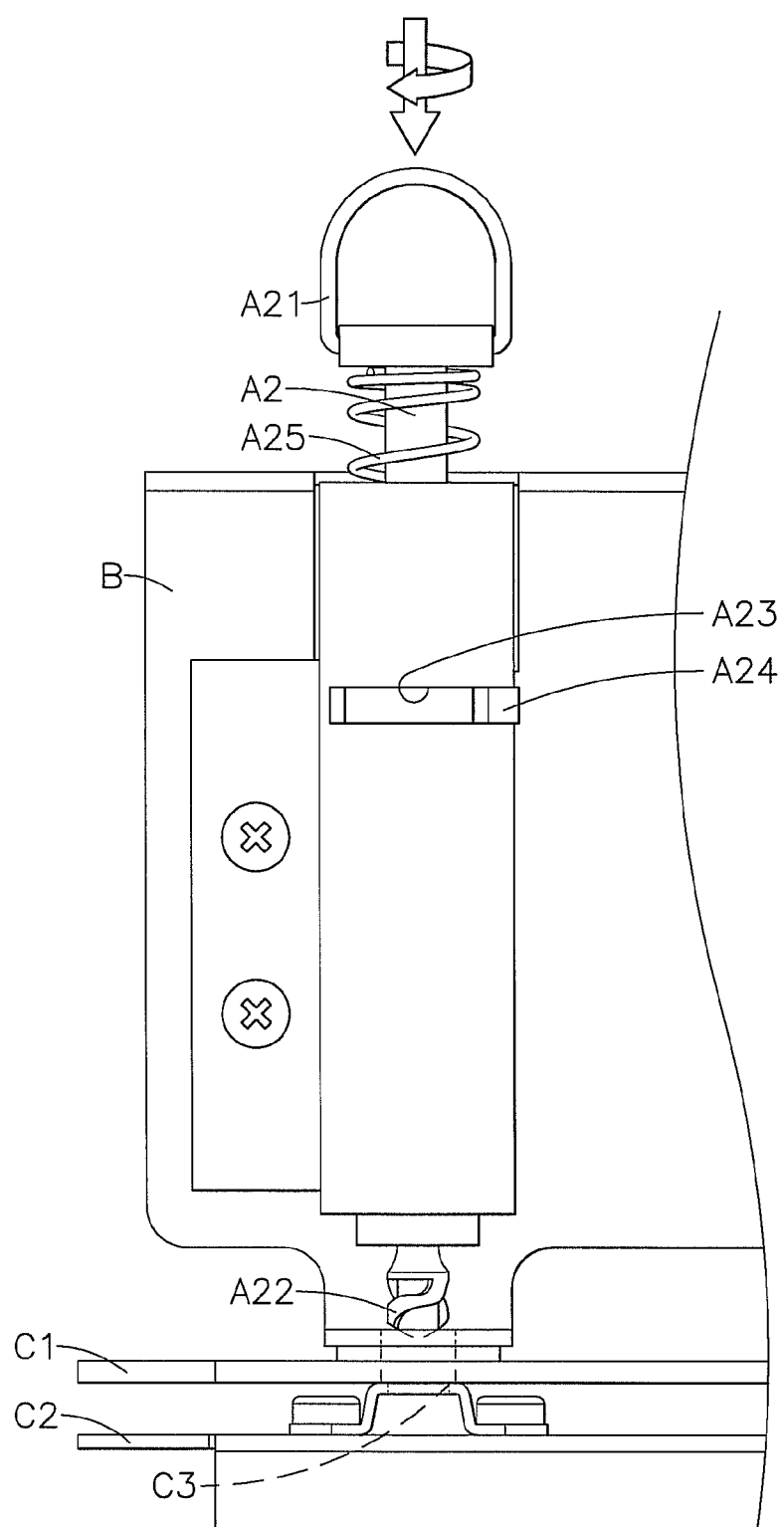
FIG. 9 is a schematic applied view of the prior art panel member locking device, illustrating the externally threaded locking rod inserted through the first panel member and threaded into the mounting screw hole of the second panel member.

Referring to FIGS. 1, 2 and 3, a panel member locking device in accordance with the present invention is shown. The panel member locking device comprises a bracket 1, a driving rod 2, a locking rod 22, a pivot pin 211, a flat swivel grip 212, a guide tube 3, a spring member 312, and a constraint member 33.

The bracket 1 comprises a longitudinal sliding space 10, an L-shaped limiter slot 11 cut through the peripheral wall thereof in communication with the longitudinal sliding space 10 and dividing the longitudinal sliding space 10 into an upper sliding space 101 and a lower sliding space 102, a shoulder 103 located on the inside wall thereof corresponding to the connection area between the upper sliding space 101 and the lower sliding space 102, a mounting flange 12 perpendicularly extended from one lateral side thereof, and a plurality of mounting through holes 120 located on the mounting flange 12 at different elevations for the mounting of screws 121 respectively. Further, the L-shaped limiter slot 11 defines a horizontal retaining slot portion 111, which extends perpendicular to the extending direction of the longitudinal sliding space 10, and a vertical release slot portion 112, which extends in parallel to the extending direction of the longitudinal sliding space 10.

The driving rod 2 comprises a top head 21 located on one end, namely, the top end thereof, a pinhole 210 transverse extending through the head 21, a bottom mounting hole 20 (in the form of, for example, a screw hole) axially disposed at an opposite end, namely, the bottom end thereof, and two cut planes 23 located on the periphery at two opposite sides near the bottom end.

The pivot pin 211 is fastened to the pinhole 210 of the driving rod 2 with the two distal ends thereof respectively extending out of the two opposite ends of the pinhole 210.

The flat swivel grip 212 comprises two bottom blocks 2121 respectively disposed at two opposite sides relative to the top head 21 of the driving rod 2, a pivot hole 2122 respectively horizontally extended through each of the two bottom blocks 2121 and respectively pivotally coupled to the two distal ends of the pivot pin 211 outside the top head 21 of the driving rod 2, and two graspable finger recesses 2123 respectively located on two opposite sidewalls thereof.

The locking rod 22 comprises a top connection end piece 221 (in the form of, for example, a screw rod) located on the top end thereof and fastened to the bottom mounting hole 20 (screw hole) of the driving rod 2, and a bottom locking end piece 222 located on the bottom end thereof. The bottom locking end piece 222 comprises two protruding blocks 2221 disposed at two opposite sides, and two flat cut planes 2222 disposed at two opposite sides and respectively connected between the two protruding blocks 2221.

The guide tube 3 is a stepped tube, comprising an axial hole 30 extending through opposite top and bottom ends thereof, a head block 31 located on the top end thereof around the axial hole 30, an annular horizontal stop face 311 horizontally located on the bottom side of the head block 31, a curved ramp 32 located on the top side of the head block 31 and defining two opposite retaining grooves 321 and two opposite positioning grooves 322 that are arranged at 90-degree intervals around the axial hole 30, and two vertical stop faces 313 longitudinally located on the periphery thereof at two opposite sides.

The spring member 312 is sleeved onto the guide tube 3 and stopped between the annular horizontal stop face 311 of the guide tube 3 and the shoulder 103 of the bracket 1.

The constraint member 33 is disposed at the top side of the head block 31 of the guide tube 3, comprising an oblong coupling hole 330 cut through opposing top and bottom sides thereof and configured subject to the cross section of the driving rod 2 at the elevation of the cut planes 23, two arched vertical bearing flanges 331 downwardly protruded from the bottom edge thereof at two opposite sides, and a horizontal stop block 332 perpendicularly extended from the periphery thereof.

When assembling the panel member locking device, pivotally connect the pivot holes 2122 of the flat swivel grip 212 to respectively horizontally extend through each of the two bottom blocks 2121 and respectively pivotally couple to the pinhole 210 of the driving rod 2 with the pivot pin 211, and then insert the driving rod 2 through the oblong coupling hole 330 of the constraint member 33 and the axial hole 30 of the guide tube 3, and then fasten the top connection end piece 221 of the locking rod 22 to the bottom mounting hole 20 of the driving rod 2, and then sleeve the spring member 312 onto the driving rod 2, and then insert the assembled driving rod 2, constraint member 33, guide tube 3, spring member 312 and locking rod 22 into the longitudinal sliding space 10 of the bracket 1 to force the horizontal stop block 332 of the constraint member 33 into the L-shaped limiter slot 11 of the bracket 1 and to have the spring member 312 be stopped between the annular horizontal stop face 311 of the guide tube 3 and the shoulder 103 of the bracket 1 and the arched vertical bearing flanges 331 of the constraint member 33 be supported on the curved ramp 32. When the panel member locking device is assembled, the constraint member 33 and the head block 31 of the guide tube 3 are disposed in the upper sliding space 101 of the bracket 1; the vertical stop faces 313 of the guide tube 3 are partially disposed in the lower sliding space 102 of the bracket 1; the constraint member 33 is attached to the cut planes 23 of the driving rod 2 by means of its oblong coupling hole 330 for allowing the constraint member 33 to be rotated with the driving rod 2; the top head 21 of the driving rod 2 and the flat swivel grip 212 are kept above the elevation of the top side of the bracket 1; the bottom locking end piece 222 of the locking rod 22 are kept below the elevation of the bottom side of the bracket 1. At this time, the user can operate the flat swivel grip 21 to rotate the driving rod 2, shifting the arched vertical bearing flanges 331 of the constraint member 33 between the retaining grooves 321 and the positioning grooves 322.

Further, the bracket 1 is shaped like a channel bar. Further, the lower sliding space 102 of the longitudinal sliding space 10 has a relatively narrower width than the upper sliding space 101 and fits the vertical stop faces 313 of the guide tube 3 to prohibit the guide tube 3 from rotation relative to the bracket 1.

Referring to FIGS. 4-7 and FIGS. 2 and 3 again, the panel member locking device is affixed to a frame shell 4 to lock a first panel member 42 and a second panel member 43 to the frame shell 4. During application, the mounting through holes 120 of the mounting flange 12 of the bracket 1 are fastened to respective mounting screw holes 40 at the frame shell 4 by respective screws 121, allowing the bottom locking end piece 222 of the driving rod 22 to be inserted into a through hole 410 (that can be a circular hole) at a horizontal bottom lug 41 of the frame shell 4 and aimed at a through hole 420 at the first panel member 42 and an oblong locating hole 430 at the second panel member 43. After installation of the panel member locking device in the frame shell 4 and attachment of the first panel member 42 with the second panel member 43 to the frame shell 4 to keep the bottom locking end piece 222 of the driving rod 22 in vertical alignment with the through hole 420 at the first panel member 42 and the oblong locating hole 430 at the second panel member 43, the user can grasp the flat swivel grip 212 using the finger recesses 2123 provided on the flat swivel grip 212, and then impart a downward pressure to the flat swivel grip 212 to lower the driving rod 2, the locking rod 22, the constraint member 33 and the guide tube 3 relative to the bracket 1 and to compress the spring member 312, moving the horizontal stop block 332 of the constraint member 33 downwardly along the vertical release slot portion 112 of the L-shaped limiter slot 11 of the bracket 1 to the horizontal retaining slot portion 111. During downward movement of the driving rod 2 and the constraint member 33, the vertical stop faces 313 of the guide tube 3 are constrained by the lower sliding space 102 of the longitudinal sliding space 10 of the bracket 1 to prevent rotation of the guide tube 3 relative to the bracket 1, and the flat cut planes 2222 of the bottom locking end piece 222 are kept in a parallel manner relative to the major axis of the oblong locating hole 430 at the second panel member 43 so that the bottom locking end piece 222 of the locking rod 22 can be inserted through the through hole 420 at the first panel member 42 and the oblong locating hole 430 at the second panel member 43. Thereafter, rotate the flat swivel grip 21 through about 90° to move the horizontal stop block 332 of the constraint member 33 horizontally along the horizontal retaining slot portion 111 of the L-shaped limiter slot 11 of the bracket 1 to force the protruding blocks 2221 of the bottom locking end piece 222 of the locking rod 22 into engagement with the second panel member 43 at the bottom side of the oblong locating hole 430, thereby locking the frame shell 4, the first panel member 42 and the second panel member 43 together. When going to detach the first panel member 42 and the second panel member 43 from the frame shell 4, rotate the flat swivel grip 212 in the reversed direction through about 90° to move the horizontal stop block 332 of the constraint member 33 horizontally along the horizontal retaining slot portion 111 of the L-shaped limiter slot 11 of the bracket 1 to the vertical release slot portion 112 and to let the flat cut planes 2222 of the bottom locking end piece 222 be kept in a parallel manner relative to the major axis of the oblong locating hole 430 at the second panel member 43, enabling the driving rod 2, the constraint member 33 and the locking rod 22 to be returned to their former position to unlock the first panel member 42 and the second panel member 43 from the frame shell 4. Thus, locking and unlocking the panel member locking device are quite simple without the use of any external hand tool.

As stated above, the driving rod 2, the locking rod 22, the guide tube 3, the constraint member 33 and the spring member 312 are assembled together and set in the longitudinal sliding space 10 in the bracket 1; the constraint member 33 has its horizontal stop block 332 coupled to the L-shaped limiter slot 11 of the bracket 1 and its arched vertical bearing flanges 331 supported on the curved ramp 32; the swivel grip 212 is pivotally coupled to the pivot pin 211 at the top head 21 of the driving rod 2, providing two finger recesses 2123 at the two opposite sidewalls thereof convenient for the positioning of the fingers to grasp the swivel grip 212. By means of grasping the swivel grip 212 to lower the driving rod 2 and then to rotate the driving rod 2, the bottom locking end piece 222 of the locking rod 22 can be accurately inserted through the through hole 420 at the first panel member 42 and the oblong locating hole 430 at the second panel member 43 and then locked at the bottom side of the oblong locating hole 430 at the second panel member 43. Thus, the panel member locking device can be conveniently operated to detachably lock the stacked first panel member 42 and second panel member 43 at the frame shell 4 without any hand tool. Subject to the matching arrangement between the arched vertical bearing flanges 331 of the constraint member 33 and the curved ramp 32 of the guide tube 3 and the horizontal stop block 332 of the constraint member 33 and the L-shaped limiter slot 11 of the bracket 1, the guide tube 3 can guide the driving rod 2 to move up and down and to rotate in horizontal direction accurately and stably.

In conclusion, the invention provides a panel member locking device, which has the following advantages and features:

1. Subject to the operation of the driving rod 22 to move the locking rod 22 axially out of the longitudinal sliding space 10 in the bracket 1 and then to rotate the locking rod 22 horizontally, the bottom locking end piece 222 of the locking rod 22 can be accurately inserted through the through hole 420 at the first panel member 42 and the oblong locating hole 430 at the second panel member 43 and then locked at the bottom side of the oblong locating hole 430 at the second panel member 43.
2. By means of coupling the constraint member 33 to the driving rod 2 for enabling the horizontal stop block 332 of the constraint member 33 to be moved between the horizontal retaining slot portion 111 and vertical release slot portion 112 of the L-shaped limiter slot 11 of the bracket 1, the bottom locking end piece 222 of the locking rod 22 can be accurately inserted through the through hole 420 at the first panel member 42 and the oblong locating hole 430 at the second panel member 43 and then positively locked at the bottom side of the oblong locating hole 430 at the second panel member 43.
3. Subject to the matching arrangement between the vertical stop faces 313 of the guide tube 3 and the lower sliding space 102 of the longitudinal sliding space 10 of the bracket 1, the guide tube 3 is prohibited from rotation relative to the bracket 1 during operation of the driving rod 2 to move or rotate the locking member 22.
4. The horizontal stop block 332 of the constraint member 33 is coupled to the L-shaped limiter slot 11 of the bracket 1 and movable in between the horizontal retaining slot portion 111 and vertical release slot portion 112 of the L-shaped limiter slot 11, enabling the bottom locking end piece 222 of the locking rod 22 to be accurately inserted through the through hole 420 at the first panel member 42 and the oblong locating hole 430 at the second panel member 43 and then positively locked at the bottom side of the oblong locating hole 430 at the second panel member 43.
5. The horizontal retaining slot portion 111 and vertical release slot portion 112 of the L-shaped limiter slot 11 are configured to limit the angle of rotation of the driving rod 2 with the constraint member 33 and the locking rod 22 to about ¼ round (90°), shortening the driving rod rotation distance and time and facilitating finger operation in a human-friendly manner.
6. When operating the driving rod 2 to move the locking rod 22 between the locking position and the unlocking position, the constraint member 33 is moved along the curved ramp 32 of the guide tube 3, ensuring accurate positioning, and the upward spring force of the spring member 312 that is applied to the driving rod 2 through the head block 31 of the guide tube 3 and the constraint member 33 enhances the engagement between the bottom locking end piece 222 of the locking rod 22 and the bottom side of the oblong locating hole 430 of the second panel member 43.

A prototype of panel member locking device has been constructed with the features of FIGS. 1~7. The panel member locking device functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A panel member locking device affixed to frame shell and adapted for detachably locking a first panel member and a second panel member to said frame shell, the panel member locking device comprising:
    a bracket comprising a longitudinal sliding space, a limiter slot cut through the peripheral wall thereof in communication with said longitudinal sliding space;
    a driving rod vertically movably set in said longitudinal sliding space of said bracket, said driving rod comprising a top head located on a top end thereof and suspending outside said bracket, and two cut planes located on the periphery thereof at two opposite sides near a bottom end thereof;
    a locking rod connected to the bottom end of said driving rod and vertically movable by said driving rod into a through hole at said first panel member and an oblong locating hole at said second panel member and rotatable by said driving rod relative to said bracket between a locking position to lock said first panel member and said second panel member to said frame shell and an unlocking position to unlock said first panel member and said second panel member from said frame shell, said locking rod comprising a bottom locking end piece located on a bottom end thereof remote from said driving rod and insertable into the through hole at said first panel member and the oblong locating hole at said second panel member and rotatable by said driving rod relative to said bracket to lock said first panel member and said second panel member to said frame shell;
    a guide tube sleeved onto said driving rod and axially movably set in said longitudinal sliding space of said bracket to guide said driving rod to move axially in said longitudinal sliding space, said guide tube comprising an axial hole extending through opposite top and bottom ends thereof for the passing of said driving rod, a head block located on a top end thereof around said axial hole, and a curved ramp located on a top side of said head block;
    a spring member sleeved onto said guide tube and stopped between said head block of said guide tube and a part of said bracket in said longitudinal sliding space to impart an upward pressure to said guide tube and said driving rod relative to said bracket; and
    a constraint member rotatable by said driving rod, said constraint member comprising an oblong coupling hole cut through opposing top and bottom sides thereof and coupled to the cut planes of said driving rod, and a horizontal stop block perpendicularly extended from the periphery thereof and coupled to said limiter slot of said bracket.

2. The panel member locking device as claimed in claim 1, wherein said bracket is shaped like a channel bar, comprising a mounting flange perpendicularly extended from one lateral side thereof, and a plurality of mounting through holes located on said mounting flange at different elevations and affixed to respective mounting screw holes at said frame shell by respective screws.

3. The panel member locking device as claimed in claim 1, wherein said limiter slot of said bracket is an L-shaped slot defining a horizontal retaining slot portion, which extends perpendicular to the extending direction of said longitudinal sliding space, and a vertical release slot portion, which extends in parallel to the extending direction of said longitudinal sliding space.

4. The panel member locking device as claimed in claim 1, wherein said driving rod comprises a bottom mounting hole located on the bottom end thereof; said locking rod comprises a top connection end piece located on a top end thereof and tightly fastened to said bottom mounting hole of said driving rod.

5. The panel member locking device as claimed in claim 1, wherein said top head of said driving rod comprises a transversely extending pinhole, a pivot pin fastened to said pinhole, and a flat swivel grip coupled to said pivot pin, said flat swivel grip comprising two bottom blocks, a pivot hole horizontally extended through each said bottom block and pivotally coupled to said pivot pin, and two graspable finger recesses respectively located on two opposite sidewalls thereof.

6. The panel member locking device as claimed in claim 1, wherein said curved ramp of said head block of said guide tube defines two opposite retaining grooves and two opposite positioning grooves that are arranged at 90-degree intervals around said axial hole of said guide tube for supporting said constraint member between said locking position and said unlocking position.

7. The panel member locking device as claimed in claim 6, wherein said constraint member comprises two arched vertical bearing flanges downwardly protruded from a bottom edge thereof at two opposite sides and movable along said curved ramp between said retaining grooves and said positioning grooves.

\* \* \* \* \*